Nov. 17, 1942.　　E. L. SCHELLENS　　2,301,976
PIPING SYSTEM
Filed July 19, 1940　　3 Sheets-Sheet 1
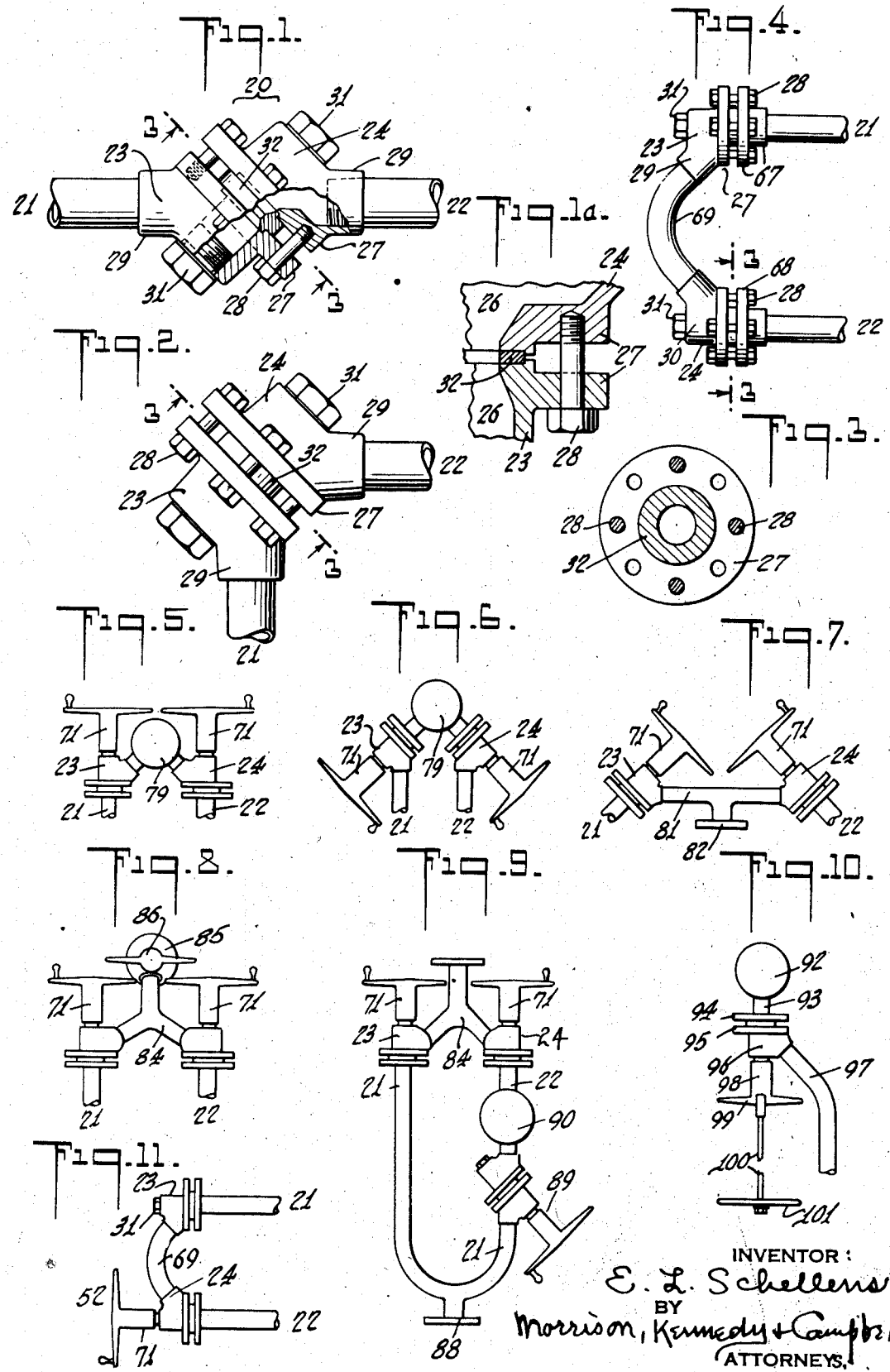

Nov. 17, 1942.　　　E. L. SCHELLENS　　　2,301,976
PIPING SYSTEM
Filed July 19, 1940　　　3 Sheets-Sheet 2
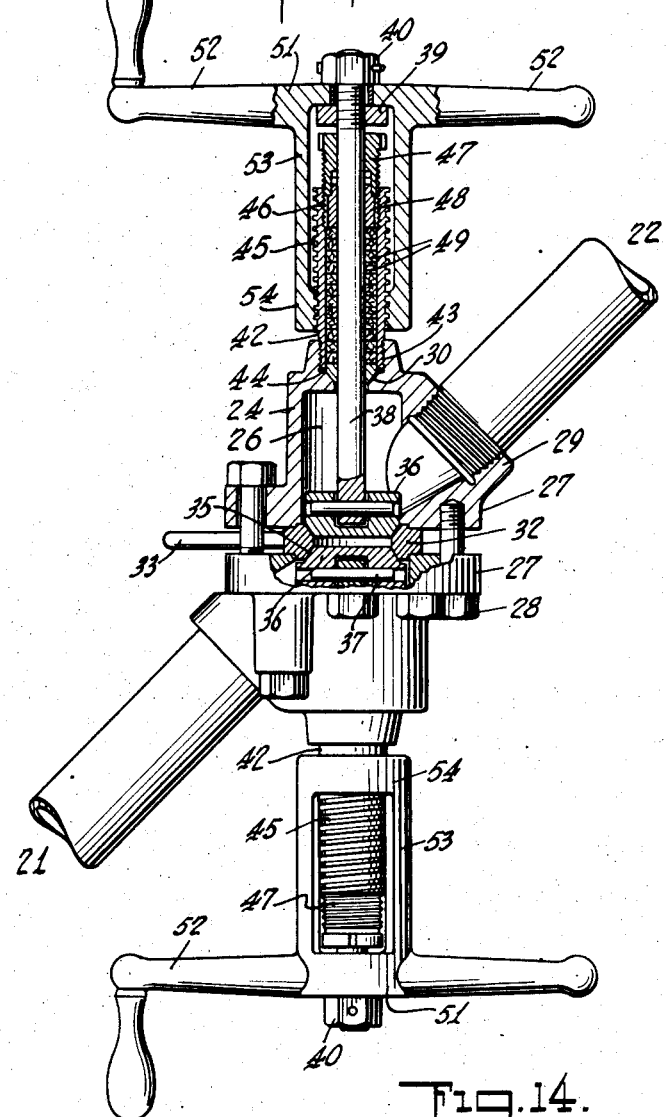
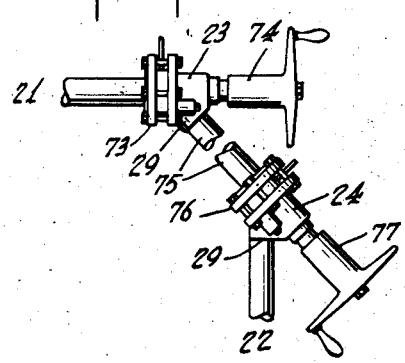
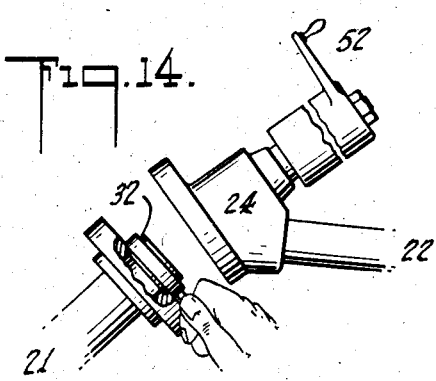
INVENTOR:
E. L. Schellens
BY
Morrison, Kennedy & Campbell
ATTORNEYS.

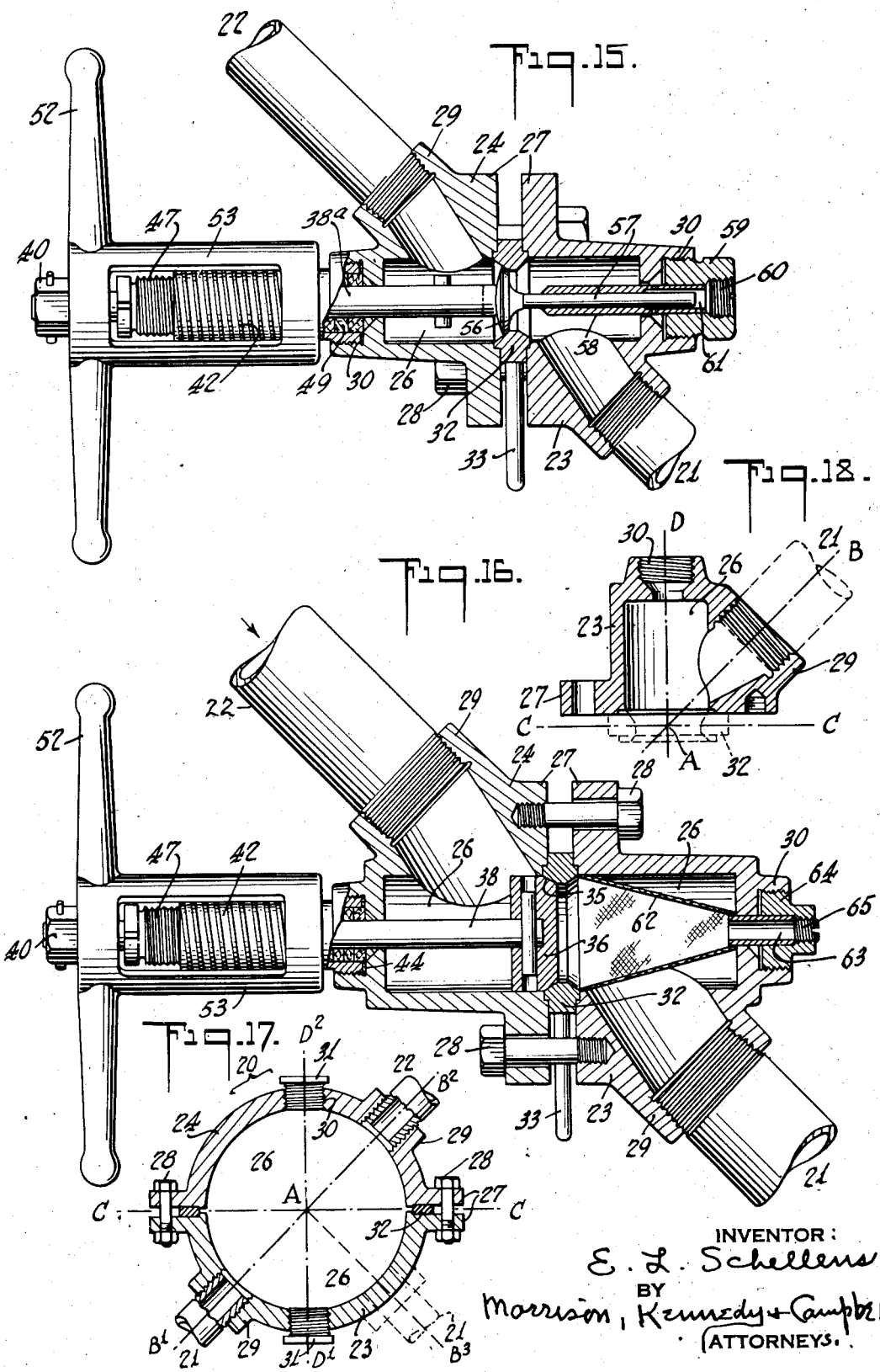

Patented Nov. 17, 1942

2,301,976

UNITED STATES PATENT OFFICE 2,301,976

PIPING SYSTEM

Eugene L. Schellens, Essex, Conn., assignor to Clyde Industries, Inc., Centerbrook, Conn., a corporation of Connecticut Application July 19, 1940, Serial No. 346,286

3 Claims. (Cl. 251—157)

This invention is a novel piping system, with pipe joints or couplings, unvalved or valved; and involving essentially one or more fixtures connected or interposed between inlet and outlet pipe sections, the term fixture being intended to include either a mere joint or connection between the pipes, or a valve in the same position. The principles of the present invention are useful in a wide range of practical utility, whether the system is intended for the flow of water or other liquid or steam or other vapor or gas; and the principles may be used for various specific types of fittings or couplings, for example to afford a mere pipe connection at various angles, or a return bend between two pipes, or for various types of valves, for example for mere flow control, or for check or stop purposes, filtering, blow-off, boiler feed and the like.

The general object of the present invention is to afford a piping system, comprising one or more coupling connections, valves or other fixtures, and built up of standard or similar parts or units by the use of which various arrangements and combinations are possible, to an almost universal extent. Another object is to simplify and cheapen the manufacture of the necessary parts for a system of coupled or valved piping; a characteristic part, the half-body, being adapted to forging and the other parts being of simple and effective design. A further object is to minimize obstruction and maintain a flow passage of clear and straight character.

Among various other objects are the minimizing of joints and hidden leakage; the ability to stand high pressures and temperatures; ready and complete access for inspection or renewal; and compactness and durability. Further objects and advantages will be made to appear in the hereinafter following description of several practical embodiments of the invention or will be understood by those conversant with the subject.

In the accompanying drawings, Fig. 1 is an elevation view, partly in section, of a portion of a piping system including a hollow fixture connected between two pipe sections shown in mutual alinement which, for convenience, may be considered as inlet and outlet pipe sections, although the direction of flow is immaterial.

Fig. 1ª is a partial view similar to part of Fig. 1, but showing a specific modification of structure.

Fig. 2 is a view similar to Fig. 1 showing the same structural elements differently combined for a different specific use, the pipe sections in this instance standing at right angles and the fixture being thus adapted to serve as a 90° elbow.

Fig. 3 is a cross sectional view taken on the line 3—3 of Figs. 1, 2 or 4.

Fig. 4 shows in elevation a varied practical application of the broad principles of the invention adapting it to serve the purposes of the conventional return bend pipe fitting.

Figs. 5 to 11 are outline views of a number of applications of the invention in the form of or associated with valves of various kinds and for various purposes.

Figs. 12, 15 and 16 are elevation views, partly in section, of three different specific valves each embodying the principles hereof.

Fig. 13 is an elevation showing a modified arrangement of double valve in outline.

Fig. 14 is a diagram illustrating the ready removability and reversibility of the fixture sealing ring or the valve seat ring.

Fig. 17 is conventionalized sectional view of a simple embodiment, useful for purposes of definition and explanation. Fig. 18 is a detached view of a half-body per se of the design embodied in all of Figs. 1 to 16.

Referring first to the embodiment shown in Figs. 1, 2 and 3 this constitutes a simple illustration of the principles of the present invention in which the fixture 20, whether a pipe or union connection, or a valve, is interposed between the pipe sections or lengths 21 and 22 constituting the inlet to or the outlet from the fixture. The fixture is a hollow body or casing but is composed of a pair of separable halves or half-bodies 23 and 24, each containing one half of the general chamber and connected to one of the two pipe sections. The two half-bodies are complementary and interchangeable, and for most purposes are preferably identical, or at least in correspondence in essential features, and have their mutually facing interior chambers 26. These parts are diagrammatically shown in Fig. 17, on which also are applied the general center A, centerlines A—B' and A—B², coupling plane C—C and axis D'—A—D² to be referred to; and see also Fig. 18.

The paired half-bodies 23 and 24 are provided with complementary coupling extensions preferably in the form of exterior flanges 27 adapted to be mutually clamped together in tight relationship in what may be termed a coupling plane C—C, and with clamping means such as a set of screws or bolts 28 drawing the flanges toward each other and thus tightly coupling the half bodies into a closed rigid hollow body or casing. In lieu of the disclosed flanges and screws the clamping may be by an exterior threaded union or sleeve, or an interior axial bolt, or otherwise.

It is characteristic of this invention that each half-body has its port or pipe connection 29, in the wall or a boss thereon, so positioned and arranged that the centerline B—A of this connection and pipe intersects interiorly and centrally the coupling plane at a slanting angle of preferably 45° or approximately that angle.

The coupling plane therefore stands at 45° to the direction of each pipe section, and the fixture acts as a joint or union with flanges disposed at this angle. The casing axis, the two pipe centerlines and the coupling plane are all seen to intersect exactly at the general center or point A; which is important for a universal piping system.

Each half body may be a forged member of a standard shape, and for high pressures it may be welded to the connected pipe. When the clamping screws are removed good access is afforded through each half body to the piping, for cleaning or other purposes. The flanges being slanted they are easily swung apart when uncoupled. Each half-body is shown provided with an additional port 30, imposed at its axis A—D, these two axial ports being in axial line, threaded and closed by plugs 31, which may be removed to afford access without unclamping the flanges 27; or a washout or other valve may be attached in place of either plug.

While the pipe sections 21 and 22 are shown in mutual alinement in Fig. 1 they may be disposed at various angles, for example at right angles as shown in Fig. 2, which thus constitutes the equivalent of a 90° elbow. As shown in Fig. 3 the flanges 27 may have screw or bolt holes spaced angularly, for example every 30° or 45°, thus to permit various relative angular arrangements as practical conditions may require. A clamp may be used of union type which affords every possible angle between 90° and 180°.

Another and preferable element shown in Figs. 1 and 2 is a ring 32 separate from but interposed and clamped between the half bodies 23 and 24, this being in the nature of a bushing or coupling ring for sealing the joint between the half bodies. This ring and the body flanges 27 are shown as being shouldered, so that a lap joint is formed, and, these parts being machined, a tight union is provided. Moreover the coupling ring is substantially thick and so always visible exteriorly between the two flanges so that any leakage is quickly perceivable. This arrangement has the further advantage that the ring is readily removable and renewable. When the fixture is used as a valve the ring 32 may be hardened and shaped to constitute a valve seat, between the two half bodies, the movable part or gate of the valve to be mounted within one of the half bodies to cooperate with the seat, as will be described. In any case the ring may have a radial handle extension or rod 33, as seen in Figs. 12 to 16, useful also in the grinding of the valve, which may sometimes be done by oscillating the handle when the clamping pressure is relaxed; otherwise by oscillating the gate while the ring is fixed.

As appears best in Fig. 17 each pipe centerline A—B' or A—B² intersects the coupling plane C—C at an interior point, the general center A, and this intersection is at a definite slanting angle in all cases, to afford universal interchangeability. An angle between 30° and 60° is essential for practical purposes and an angle of 45° is greatly superior and preferred in the designing of a system of interchangeable parts according to this invention. The general axis D'—D² of the fixture or valve is shown at right angles to the coupling plane C—C, so that each flow centerline is at 45° both to the coupling plane and to the axis.

Fig. 17 in dotted lines indicates how one centerline A—B' can be swung around to various positions, for example, from the straight line position B'—A—B² to the 90° position B²—A—B³, converting the fixture to the equivalent of a 90° elbow. Selectively, various other rotary positions may be established thereby to afford various angles between the two pipes of from 90° to 180°. When the clamping means 28 is removed complete accessibility is afforded to the ring, the half-body interiors, and the pipes themselves.

Each pair of half-bodies is adapted to be converted from a mere pipe connection to a valve by the replacement of one or both of the plugs 31 by suitably attached valve parts, working on the general axis, as will be described in connection with later figures. The coupling ring 32 in this case is designed not merely as a sealing ring but extending inwardly to serve as a valve seat, cooperable with an interior valve gate or disk member which is movable to and from the seat member by an axial stem or carrier having exterior means for operating it.

In the modification shown in Fig. 1ª the sealing ring 32 takes a different shape and position, in this form being unadapted to serve as a valve seat ring. It may be in the nature of a washer or packing, preferably incompressible to avoid variation in the dimensions of the entire fixture. A still different coupling ring arrangement is shown in Fig. 17. When the ring is to serve as a valve seat it preferably takes such a form as is shown in Fig. 12, next to be described.

Fig. 12 shows in detail a typical embodiment of the present invention in its use as a valve interposed between pipe sections 21 and 22. This will be described in advance of the various practical applications indicated in Figs. 5 to 11 and 13. Fig. 12 illustrates a double valve, the seat ring 32 having opposite seat surfaces 35 cooperating with two independently movable valve gates or disks 36. This particular embodiment is useful as a twin-unit blow-off valve wherein both valve gates must be retracted from the double seat to permit escape, for example of sediment in a boiler, from pipe 22 leading from the boiler to pipe 21 leading to waste; this construction of blow-off valve meeting the most rigid safety requirements. Either valve may be wholly removed for repair or other purpose.

In the valve of Fig. 12 the axes of the half-bodies 23 and 24, and the coupling extensions 27 bear the same 45° relation to the piping centerline as already described. The two half-bodies are shown of identical structure and may be very similar or identical in all essentials to that shown in Fig. 1. Instead however of the access plug 31 in each half-body, the Fig. 12 valve is provided with a valve bonnet, or attached body extension 42, fitted into the axial port 30, to contain or support the valve operating means and packings of special character. Since the upper and lower valve parts are identical in Fig. 12 it will suffice to describe only the upper part. Straightline flow between pipes 21 and 22 is shown but this may be changed to 90° or other angle as already explained.

Each valve disk 36 is attached by a pin 37 to its operating spindle or stem 38. These parts have no rotation during adjustment, which fact better preserve the packing. Near the outer end of the stem it carries a fast collar 39 and outwards of it an end nut or threaded collar 40 pinned to the stem. These two collars 39 and 40 are spaced well apart to receive loosely between them the apertured plate or hub 51 of the handle to be described, so that said hub may press against one or the other collar to move the valve stem axially, without turning it.

Each half-body, instead of the axial plug 31, is provided with a valve bonnet 42, being a casing extension or sleeve, screw threaded at its lower end 43 tightly into the half-body port 30. A gasket 44 may be interposed at the inner end of the bonnet sleeve or the bonnet may be expanded into tight fit with the port wall. The exterior of the outer end of the bonnet is formed with valve-operating threads 45. Being outside the bonnet these threads are of large diameter, and therefore each thread may be and is designed of large size and contact area so that wear is negligible in practical use. The bonnet, also near its outer end, has a fine interior thread 46 in which is engaged the threaded packing nut 47 which may be turned to press inwardly a sliding sleeve or gland 48 which bears against and compresses the packing material 49 consisting of rings or helices directly surrounding and sealing the valve stem 38. As shown the packing, between the stem and the bonnet, may be made quite deep and therefore effective. The gland is relatively deep and the entire structure is quite easy to repack.

The operation of the described valve is by a handle 52, the apertured hub 51 of which extends between the stem collars 39 and 40. The handle has an inwardly extending sleeve 53 of substantial length, and laterally open as seen in the lower part of Fig. 12, and this extension is formed at its inner end with a nut 54 or interior thread which engages the large thread 45 on the exterior of the bonnet. The operation is that upon turning the handle 52 in one direction the cooperating threads 45, 54 cause the handle to move itself outwardly, thereby sliding the stem and opening the valve. The stem need not rotate, since the handle hub turns loosely between the stem collars, which may be lubricated. The described arrangement permits the ready tightening of the packing by inserting a simple tool as a screw driver into engagement with the notched outer end of the packing nut 47, and then turning the handle 52 to apply pressure to the tool for turning the nut and tightening the packing. The valve shown in Fig. 12 can stand high pressures and temperatures for example 600 pounds steam pressure up to 750° F.

The coupling ring 32 is seen to have substantial thickness in Fig. 12 and in Fig. 1 and other figures. Such thickness is to be uniform for the interchangeable system, and it causes a notable spacing between the coupling flanges 27, and therefore affords a clear view of the juncture of the ring with each half-body for detecting leakage exteriorly, a great advantage. The coupling plane C—C of the fixture or valve and of each half-body is not at either coupling flange surface, but is inwards therefrom, and passes midway of the ring thickness, which is taken into account in defining the arrangement and designing the parts. This permits universal interchangeability, since every half-body, whether for valve or other fixture may be essentially identical with all others, that is, the same as to the angular and dimensional relations of the coupling flanges, the fixture or valve axis and each pipe and connection centerline.

Having described the mere coupling fixture of Figs. 1 to 3 and the valve fixture of Fig. 12 further reference may be made to the elements thereof as comprising a piping system. In each case the entire body or casing is composed of the mated half bodies, which are not merely similar but are complementary and interchangeable; and each half-body as shown in Fig. 1 will be seen to correspond with those shown in Fig. 12, being substantially identical in essence. Thus, each half-body in each embodiment comprises the coupling flange adapted to be coupled tightly to a corresponding flange, with a coupling ring or seat between. Each half-body is hollow, providing a chamber through which the flow passes. Each half-body has its port connection for its pipe section, namely in the boss 29, so positioned and arranged in its wall that the centerline of such port connection extends centrally through the coupling plane at an angle of 45°, or approximately that. This fact is best shown in the diagram of Fig. 17, and in Fig. 18. Thus the several half-bodies are identical in essence and are interchangeable, so that by making a choice of parts for particular needs various assemblages may be made up.

In each case the half-body has a threaded port on the axis of the fixture or valve. In Figs. 1 and 17 this port is closed by a plug, but by removing the plug and substituting a valve casing extension or bonnet any half body as in Fig. 1 may be converted to a valve half casing, as in Fig. 12. Thus a quite universal system is possible, the many combination assemblages being built up from identical units or pieces, which gives great versatility in meeting particular demands, as well as affording great economy in manufacture, for example for forging in great quantities the identical half bodies, two of which with the interposed ring, form the fixture or valve body subject to modification in endless ways. A simple modification of Fig. 12 is to remove either valve bonnet 42 and replace it by a closing plug 31, converting the double valve to a single valve with reversible seat.

Fig. 15 shows a modified form of valve built up on the basis of the same form of half-body as in Figs. 1 and 12. Many reference numerals are the same as in Fig. 12, but the valve details are essentially different, Fig. 15 indicating a check valve which, moreover, is adapted to closure, thereby constituting a non-return or check-and-stop valve, useful for example for boiler feed purposes.

In Fig. 15 the valve disk or gate 56 is carried on a stem 57 which slides in a fixed sleeve 58 attached within a threaded plug 59 mounted in the port 30 of one of the half-bodies 23. The plug has an access port which is closed by a smaller plug 60. A spring or gravity may be relied upon to return the valve disk 56 to the seat 32, although the fluid pressure is usually adequate. When the flow is from pipe 21 through the valve to pipe 22, the gate opens to permit free flow, but on any reverse flow or pressure the gate promptly closes upon the seat, checking the return of the fluid. To constitute a simple check valve the half-body 24 might have its port 30 occupied by a simple plug, but in Fig. 15 is shown a control means whereby the valve gate may be pushed into closed position and locked there to close the valve, this being effected by a valve stem 38ª mounted and operated by a handle 52 in the manner already described; this arrangement not merely permitting the valve to be closed and held so but permitting a regulated degree of valve opening when the flow is toward the boiler, this being effected by backing outwardly the stem 38ᵃ to a selected position imposing any desired degree of resistance or throttling of the water being pumped toward the boiler. The pushing rod or stem 38ᵃ is shown as closing the valve but in dotted lines allowing it to open.

The Fig. 15 valve is good for heavy duty interconnection between high pressure vessels or boilers. The valve disk and stem have regulable movement, and are preferably made on poppet valve principles, thus having negligible wear. The stainless steel seat ring 32 also can stand innumerable impacts. The guide sleeve 58 is long and of small diameter. Below it and stem 57 is a collecting pocket 61 from which dirt is readily cleanable, by removing the small plug 60, which also affords easy inspection of freedom of travel or sliding of the stem 57 loosely in the sleeve.

Fig. 16 shows another type of valve, a "straight-through" valve with a liquid or vapor strainer 62 embodied in one half-body. The strainer is conical and easily inserted or replaced, being held by the ring 32 and its outer small end positioned by a projecting member 63 mounted in the port 30. The member 63 is preferably a tube set centrally in a plug 64 screwed into the port, so that it can be used for clean-out purposes, to clear the strainer. The plug 64 has a discharge port closed by a removable smaller plug 65. When the flow is from pipe 22 to 21 the collected solids remain inside the cone. To blow them out the valve gate 36 is closed on its seat 32, the plug 65 removed and the valve opened slightly for blow-off purposes. The straightline flow may be changed to 90° or some angle between.

By omitting the strainer the valve meets the purposes of a heavy-duty low-resistance globe valve.

Fig. 4 is the first of a series showing the two half-bodies cooperatively but remotely positioned in the piping or valve system. Here the pipes 21 and 22 are connected for 180° reversal of flow as in a return band. Each pipe has a standard coupling flange at its end, the flange 67 on pipe 21 and 68 on pipe 22. By flange 67 and screws 28 the half-body 23 is attached to pipe 21, while half-body 24 is similarly attached to pipe 22. But first the two half bodies have been connected upon the ends of a nipple 69 having its ends bent 90° to each other. It forms a curved arch. When elements 23, 69, 24 are mutually attached they form a unit ready to incorporate in a return bend. The plugs 31 close the axial ports and an unvalved fixture is afforded.

However, in this and other forms, any half-body is adapted to have its axial plug replaced by parts converting it to a combined coupling and valve. Thus Fig. 11 differs from Fig. 4 in that one plug 31 is replaced by a valve 71, with operating handle 52, and there is afforded a return bend with single valve; and the other plug can be similarly and simply replaced. In these and similar cases the port 30 is in alinement with the pipe 21 or 23, giving straight access to the pipe when the plug or the valve is removed.

Another embodiment is shown in Fig. 13, a variation of the double blow-off valve of Fig. 12. Fig. 13 shows a tandem blow-off valve. The first pipe 21 has an end flange 73 coupled to the flange of the first half-body 23, in which is fitted a first valve 74. To the boss 29 of half-body 23 is connected an intermediate pipe 75, short or long, having an end flange 76 coupled to the flange of the second half-body 24, which carries the second valve 77 and has its boss or port 29 connected to the second pipe 22. Pipe 22 is shown issuing at right angles to pipe 21, but may be shifted to parallel, or any angle between 90° and 180° by turning half-body 24 on the pipe flange 76. For direct alinement the set-up of Fig. 12 is preferable, and in that arrangement the angle may likewise be varied between 90° and 180°.

Fig. 5 differs from Fig. 11 in having two valves 17, one for each half-body and in omitting the arched nipple 69, the two half-bodies 23, 24 instead being connected by short nipples to a header 79. It affords a low-resistance header set-up for close quarters, the valve handles 52 being adjacently in line. In Fig. 6 as in Fig. 5 the pipes 21, 22 are parallel, but by a rearrangement the valves and handles in Fig. 6 are at 45° to the pipes, or 90° to each other.

In Fig. 7 pipes 21 and 22 are at right angles as are the valves and handles. Between the half-bodies is a pipe length 81 and this has a branch 82. Either or both pipes 21 and 22 may be connected with the branch. A different arrangement is shown in Fig. 8 wherein a Y-pipe 84 connects to the branch leading to a third half-body 85, which may carry a third valve 86.

In Fig. 9 is shown a by-pass set-up useful for reducing valves, traps and various other purposes. Pipe 21 has a branch connection 88, and extends through a strainer valve 89 like that of Fig. 16 to a header 90, with which pipe 22 also is connected. The assemblage is made up of four identical half-bodies, three valve sets combined therewith, and standard pipe sections connecting these with the header. As in each of Figs. 4 to 8, Fig. 9 shows two remotely cooperating half-bodies 23 and 24.

Fig. 10 shows a special use of a single half-body in a combination useful for drainage, blow-off or other purposes. For example, a header 92 may be connected with a drain nipple or pipe 93 having an end flange 94 coupled with the flange 95 of a half-body 96, in the 45° port of which is connected a pipe 97 for fluid flow or descending drainage. The half-body also has a controlling valve 98, for example like the lower part of Fig. 12, with valve handle 99; and there is shown an extension rod 100 and remote valve handle 101 for convenient access. By placing the nipple 93 at the bottom of passage 92 the arrangement affords perfect drainage with easy downflow and discharge through pipe 97.

The improvement hereof, as a piping system or fixture, may be viewed in the aspect that the cooperating hollow halves 23 and 24 are identical and are removably coupled to each other at the two sides of a coupling plane disposed midway between them, the identical halves each having the following structural features. First, each of the two halves has a generally circular pressure chamber portion, with their two chambers in communicating alinement along the general axis of the fixture, which is the common axis of the combined chamber and is disposed at 90° to the coupling plane. Second, each of the two halves has a coupling extension or flange, these two removably coupled to each other at such coupling plane, preferably with a sealing ring interposed. And third, each of the two halves has a ported inlet or outlet pipe connection disposed with its centerline at 45° both to the coupling plane and to the general axis, and each such centerline intersecting such plane substantially at the point of intersection of the axis with the plane. By rendering the coupling extensions adapted to be coupled at various rotary positions the connected pipes can have their centerlines either coinciding in straight alinement or at a selected angle. By providing a port at the outer end of each pressure chamber portion, these axial ports can be fitted either with closing plugs or one or both with valve parts cooperating with the sealing ring shaped to serve as a valve seat.

There have thus been described a number of piping systems, valved and unvalved, embodying the principles and attaining the objects of the present invention; but since many matters of operation, combination and construction may be variously modified without departing from the novel features it is not intended to limit the invention to such matters except to the extent set forth in the appended claims.

What is claimed is:

1. In a piping system a valved fixture to be interposed between two pipe sections, said fixture comprising a pair of separate and interchangeable hollow half-bodies of substantially identical structure and dimensions adapted to be connected cooperatively to the two pipe sections, said half-bodies each having a coupling extension adapted to be coupled in tight relationship to the corresponding extension of the other half-body, and a valve seat ring clamped in central position between said half-bodies at the coupling plane thereof; each half-body having its port connection to its pipe section so positioned that the center-line of such connection and connected pipe section intersects at 45° the coupling plane, the coupling extension of each of the half-bodies being adapted to be positioned selectively in different rotated relations thereby to vary the angle between its two pipe section connections; and each half-body having its wall formed with a boss having a closable or threaded aperture so positioned that the axis of such aperture lies in the general axis of the fixture extending through the seat ring center at right angles to the coupling plane of the half-body and therefore at 45° to its pipe connection center line; each of said half-bodies carrying a removable closing means occupying the closable axial aperture thereof, and at least one of said two closing means consisting of a valve mechanism mounted in said axial aperture of the half-body and having an interior gate movable toward and from said seat and exterior means for closing and opening the valve.

2. In a piping system a valve fixture interposed between inlet and outlet pipe sections, said fixture comprising a hollow body composed of a pair of separable hollow half-bodies of the same structure and dimensions adapted to be connected respectively to the two pipe sections, said half-bodies having complementary coupling extensions adapted to be coupled together in tight relationship at the two sides of a central coupling plane and with clamp means so coupling said half-bodies to unite them into a closed rigid hollow body, and a separate sealing ring held clamped between said half-bodies in such coupling plane and constituting a central valve seat ring; each half-body having its port connection to its pipe section so positioned that the centerline of such connection and connected pipe section intersects at 45° the coupling plane at the general center point of the fixture; the coupling extensions of the half-bodies being adapted to be positioned selectively in different rotated relations thereby to vary between 90° and 180° the angle between the two pipe section connections; and each half-body having in its wall a closable threaded aperture so positioned that its axis intersects at 90° the coupling plane at such general center point so that the aperture axes of the coupled half-bodies both coincide to constitute the general axis of the fixture at 45° to both pipe connection center lines; one of said half-bodies carrying a valve with an interior gate movable toward and from said seat and a stem movable through the axial aperture of the half-body and mechanism mounted in said aperture and exteriorly operable for actuating said stem; and the other of said half-bodies having a closing member occupying and closing the threaded axial aperture thereof and removable at will to afford access to said seat ring without uncoupling the half-bodies or disassembling them from the pipe sections.

3. A valved fixture as in claim 2 and wherein the recited valve and mechanism are carried in the fixture half-body to which the inlet pipe section is connected; whereby on closing said valve the opposite half-body is shut off from the fluid pressure, and may be opened by removal of its closing member without outflow of fluid therethrough.

EUGENE L. SCHELLENS.